United States Patent
Takami et al.

(10) Patent No.: US 8,043,739 B2
(45) Date of Patent: Oct. 25, 2011

(54) NONAQUEOUS ELECTROLYTE SECONDARY BATTERY AND BATTERY MODULE

(75) Inventors: Norio Takami, Yokohama (JP); Hiroki Inagaki, Kawasaki (JP); Yoshinao Tatebayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/981,756

(22) Filed: Dec. 30, 2010

(65) Prior Publication Data

US 2011/0104560 A1    May 5, 2011

Related U.S. Application Data

(63) Continuation of application No. 11/470,482, filed on Sep. 6, 2006, now Pat. No. 7,892,674.

(30) Foreign Application Priority Data

Sep. 9, 2005   (JP) ................................. 2005-262580

(51) Int. Cl.
*H01M 2/26* (2006.01)

(52) U.S. Cl. ... 429/161; 429/178; 429/211; 429/231.95; 429/245

(58) Field of Classification Search .................. 429/161, 429/178, 211, 231.95, 245
See application file for complete search history.

(56) References Cited

U.S. PATENT DOCUMENTS

| | | | |
|---|---|---|---|
| 6,143,442 A * | 11/2000 | Takahashi et al. | 429/179 |
| 7,582,386 B2 | 9/2009 | Takami | |
| 7,662,515 B2 | 2/2010 | Inagaki | |
| 7,803,483 B2 | 9/2010 | Takami | |
| 7,858,234 B2 | 12/2010 | Morishima | |
| 2004/0023108 A1 * | 2/2004 | Nakanishi et al. | 429/178 |
| 2005/0064282 A1 | 3/2005 | Inagaki et al. | |
| 2005/0069777 A1 | 3/2005 | Takami et al. | |
| 2005/0221173 A1 | 10/2005 | Tatebayashi et al. | |
| 2005/0221187 A1 | 10/2005 | Inagaki et al. | |
| 2005/0221188 A1 | 10/2005 | Takami et al. | |
| 2006/0046155 A1 | 3/2006 | Inagaki et al. | |
| 2006/0068272 A1 | 3/2006 | Takami et al. | |
| 2006/0134520 A1 | 6/2006 | Ishii et al. | |
| 2006/0216600 A1 | 9/2006 | Inagaki | |
| 2006/0257746 A1 | 11/2006 | Inagaki | |
| 2007/0009798 A1 | 1/2007 | Inagaki | |
| 2007/0072080 A1 | 3/2007 | Inagaki | |
| 2007/0231690 A1 | 10/2007 | Fujita | |
| 2007/0231693 A1 | 10/2007 | Inagaki | |
| 2007/0281214 A1 | 12/2007 | Saruwatari | |
| 2008/0070115 A1 | 3/2008 | Saruwatari et al. | |
| 2008/0176142 A1 | 7/2008 | Inagaki | |
| 2008/0241687 A1 | 10/2008 | Ishii | |
| 2009/0291354 A1 | 11/2009 | Inagaki | |

FOREIGN PATENT DOCUMENTS

JP    2000-277091    10/2000

(Continued)

*Primary Examiner* — Jane Rhee
(74) *Attorney, Agent, or Firm* — Oblon, Spivak, McClelland, Maier & Neustadt, L.L.P.

(57) ABSTRACT

A nonaqueous electrolyte secondary battery, having an internal resistance of 10 m$\Omega$ or less as an alternating-current impedance value of 1 kHz, comprises a metal outer container, a nonaqueous electrolyte contained in the container, a positive electrode contained in the container, a negative electrode contained in the container, a separator interposed between the negative electrode and the positive electrode, a negative electrode lead having one end connected to the negative electrode, and a negative electrode terminal attached to the outer container so as to be connected electrically to the other end of the negative electrode lead, at least the surface of the negative electrode terminal which is connected to the negative electrode lead being formed of aluminum alloy with an aluminum purity of less than 99 wt. % containing at least one metal selected from the group consisting of Mg, Cr, Mn, Cu, Si, Fe and Ni.

11 Claims, 5 Drawing Sheets

FOREIGN PATENT DOCUMENTS

| | | |
|---|---|---|
| JP | 2003-036825 | 2/2003 |
| JP | 2004-296256 | 10/2004 |
| JP | 2005-123183 | 5/2005 |
| JP | 2005-135634 | 5/2005 |
| JP | 2006-120616 | 5/2006 |
| JP | 2007-018881 | 1/2007 |
| JP | 2007-95496 | 4/2007 |

* cited by examiner

NONAQUEOUS ELECTROLYTE SECONDARY BATTERY AND BATTERY MODULE

CROSS-REFERENCE TO RELATED APPLICATIONS

This application is a continuation of U.S. patent application Ser. No. 11/470,482, filed Sep. 6, 2006, the disclosure of which is incorporated herein by reference in its entirety. This application claims the benefit of priority from prior Japanese Patent Application No. 2005-262580, filed Sep. 9, 2005, the disclosure of which is incorporated herein by reference in its entirety.

BACKGROUND OF THE INVENTION

1. Field of the Invention

The invention relates to a nonaqueous electrolyte secondary battery and a battery module.

2. Description of the Related Art

A nonaqueous electrolyte secondary battery using a lithium metal, lithium alloy, lithium compound or carbon material for its negative electrode is expected as a high energy density battery or high output density battery, and it has been intensively researched and developed. So far, lithium batteries comprising a positive electrode containing $LiCoO_2$ or $LiMn_2O_4$ as an active material and a negative electrode containing a carbon material for intercalating and deintercalating lithium ions have been widely put in practical use. In the negative electrode, various materials which are a substitute for the carbon material are being studied, such as metal oxides and alloys.

In a nonaqueous electrolyte secondary battery, a copper foil is generally used as a current collector of a negative electrode. A lead and a terminal to which the lead is connected are usually made of copper or nickel. A secondary battery comprising a negative electrode including a current collector of copper foil is elevated in potential of the negative electrode in an overdischarged state. Accordingly, the dissolving reaction of the negative electrode made of copper foil is promoted, and the discharge capacity drops suddenly. When a long cycle continues in a battery module, a battery capacity balance is broken, and overdischarge may occur in certain batteries. For this reason, the current collector made of copper foil, which is assembled in a battery in an overdischarged state begins to dissolve. Therefore, the secondary battery is provided with a protective circuit for preventing itself from being overdischarged.

However, since such a protective circuit is installed, the secondary battery is reduced in energy density. If an outer container having a thin metal can is used in order to reduce the battery weight, copper for composing the current collector of the negative electrode, lead and terminal is dissolved, for example, at the time of overdischarging, and swelling of the battery increases.

Hence, JP-A. 2004-296256 (KOKAI) discloses a nonaqueous electrolyte secondary battery using an aluminum foil or aluminum alloy foil for a negative electrode current collector, in use of a negative electrode active material for intercalating lithium ions at a specific potential. Such a configuration makes it possible to realize a nonaqueous electrolyte secondary battery enhanced in energy density and overdischarge cycle performance. Further, since this nonaqueous electrolyte secondary battery can elevate the discharge capacity over several Ah or tens Ah, it is highly expected to be used as a square nonaqueous electrolyte secondary battery for use in, aside from electric power storage, vehicles such as a power-assisted bicycle, electric scooter, electric vehicle, hybrid vehicle, and electric train.

An on-board secondary battery is required to be low in internal resistance, high in energy density, and high in output density, for the purpose of obtaining high output. Further, excellent cycle performance, and high strength and corrosion resistance of materials for a long period are demanded in the conditions of high temperature, high humidity, vibration, quick charging, high output discharge, and overdischarge. Therefore, for the purpose of maintaining the internal resistance of the battery at a low level, a connecting portion between a lead and a terminal where current in the battery is concentrated is required to be high in mechanical strength, electrochemical stability, and chemical stability in the high temperature and high humidity environment for a long period, thereby maintaining low resistance excellent in corrosion resistance.

However, when in the secondary battery described above, the lead and terminal of the negative electrode are formed of copper with an excellent conductivity, a corrosion or dissolving reaction may be advanced in the connecting portion between the lead and terminal in an overdischarge operation of the battery or high temperature and high humidity environment over a long period of use, and thereby the resistance is increased. For this reason, it becomes difficult to obtain high output from the battery and battery module. Further, since the impedance is increased, the discharge reaction of the positive electrode and negative electrode is not promoted sufficiently in high output discharge, and a utility rate of an active material is lowered.

On the other hand, JP-A 2003-36825 (KOKAI) discloses a nonaqueous electrolyte battery high in safety, the battery having a terminal structure capable of preventing or suppressing sparks possibly occurring in a terminal unit due to leak of a nonaqueous electrolyte. This document, in paragraph [0036], discloses that a negative electrode terminal 40 made of copper alloy is composed of a current collector 40a serving as an internal terminal and a bolt-like external terminal unit 40b; that the current collector 40a is bonded to a band-like negative electrode lead 12a extending from an electrode body 10; that the external terminal unit 40b is positioned outside of a negative electrode side lid plate 23 of a battery case 20; and that the exposed surface portion is plated with aluminum to prevent spark generation.

In the nonaqueous electrolyte battery, the current collector 40a of the negative electrode terminal 40 to which the negative electrode lead is connected is made of copper alloy. Therefore, as mentioned above, a corrosion or dissolving reaction is promoted in a connecting portion between the lead and terminal in an overdischarge operation of the battery or high temperature and high humidity environment over a long period of use, and the internal resistance increases. Consequently, it becomes difficult to obtain a high output from the battery or battery module.

BRIEF SUMMARY OF THE INVENTION

According to a first aspect of the present invention, there is provided a nonaqueous electrolyte secondary battery having an internal resistance of 10 mΩ or less at an alternating-current impedance value of 1 kHz, comprising;
 a metal outer container;
 a nonaqueous electrolyte contained in the container;
 a positive electrode contained in the container;

a negative electrode contained in the container and having an active material for intercalating lithium ions at a potential of 0.4 V or more with respect to an electrode potential of lithium;

a separator interposed between the negative electrode and the positive electrode;

a negative electrode lead having one end connected to the negative electrode, the negative electrode lead being made of aluminum with a purity of 99 wt. % or more, or aluminum alloy with an aluminum purity of 99 wt. % or more; and a negative electrode terminal attached to the outer container so as to be connected electrically to the other end of the negative electrode lead, at least the surface of the negative electrode terminal which is connected to the negative electrode lead being formed of aluminum alloy with an aluminum purity of less than 99 wt. % containing at least one metal selected from the group consisting of Mg, Cr, Mn, Cu, Si, Fe and Ni.

According to a second aspect of the present invention, there is provided a battery module assembled by connecting a plurality of nonaqueous electrolyte secondary batteries recited in the first aspect.

According to a third aspect of the present invention, there is provided a nonaqueous electrolyte secondary battery having an internal resistance of 10 mΩ or less at an alternating-current impedance value of 1 kHz, comprising:

a metal outer container serving also as a negative electrode terminal;

a nonaqueous electrolyte contained in the container;

a positive electrode contained in the container;

a negative electrode contained in the container and having an active material for intercalating lithium ions at a potential of 0.4 V or more with respect to an electrode potential of lithium;

a separator interposed between the negative electrode and the positive electrode; and a negative electrode lead having one end connected to the negative electrode, and the other end connected to the inner side of the container, the negative electrode lead being made of aluminum with a purity of 99 wt. % or more, or aluminum alloy with an aluminum purity of 99 wt. % or more, wherein at least the inner surface of the outer container which is connected to the negative electrode lead is formed of aluminum alloy with an aluminum purity of less than 99 wt. % containing at least one metal selected from the group consisting of Mg, Cr, Mn, Cu, Si, Fe and Ni.

According to a fourth aspect of the present invention, there is provided a battery module assembled by connecting a plurality of nonaqueous electrolyte secondary batteries recited in the third aspect.

DETAILED DESCRIPTION OF THE INVENTION

Figure 1:
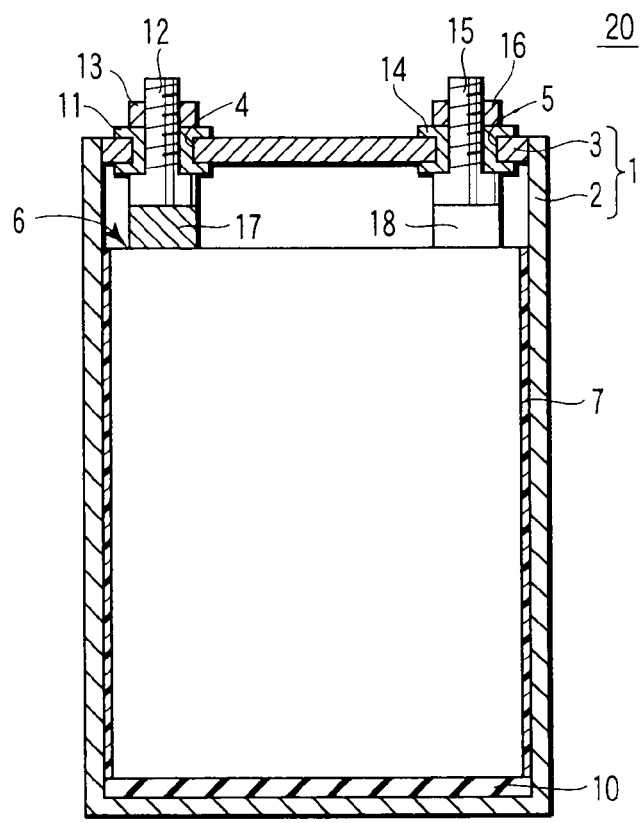
FIG. 1 is a sectional view showing a square nonaqueous electrolyte secondary battery according to a first embodiment.

Embodiments of the invention mainly refer to a square nonaqueous electrolyte secondary battery and battery module, but circular nonaqueous electrolyte secondary batteries and the like are also included in the scope of the present invention.

First Embodiment

A square nonaqueous electrolyte secondary battery according to a first embodiment comprises a metal outer container, a nonaqueous electrolyte contained in the container, a positive electrode contained in the container, a negative electrode contained in the container and having an active material for intercalating lithium ions at a potential of 0.4 V or more with respect to an electrode potential of lithium, and a separator interposed between the negative electrode and the positive electrode. A negative electrode lead has one end connected to the negative electrode. The negative electrode lead is made of aluminum with a purity of 99 wt. % or more, or aluminum alloy with an aluminum purity of 99 wt. % or more. A negative electrode terminal is attached to the container so as to be connected to the other end of the negative electrode lead. At least the surface of the negative electrode terminal connected to the negative electrode lead is formed of aluminum alloy with aluminum purity of less than 99 wt. % containing at least one metal selected from the group consisting of Mg, Cr, Mn, Cu, Si, Fe and Ni. The positive electrode is connected to a positive electrode terminal attached, for example, to the container through a lead. Such a secondary battery has an internal resistance of about 10 mΩ or less as an alternating-current impedance value of 1 kHz. More specifically, the secondary battery has a large discharge capacity of, for example, 2 Ah or more.

The negative electrode, positive electrode, separator, nonaqueous electrolyte, and outer container will be specifically described below.

1) Negative Electrode

The negative electrode includes a current collector, and a negative electrode layer held on one side or both sides of the current collector and having an active material, a conductive agent, and a binder.

The current collector is made of, for example, aluminum foil or aluminum alloy foil with a purity of 99 wt. % or more. The aluminum alloy is preferably an alloy containing a metal such as Mg, Zn, Mn, or Si. Aside from the metal, the aluminum alloy preferably contains transition metal such as Fe, Cu, Ni, or Cr at 100 ppm or less.

The aluminum foil or aluminum alloy foil use as the current collector is preferably 50 μm or less in average diameter of crystal grains. A more preferred average diameter of crystal grains is 10 μm or less. Here, an average diameter d of crystal grains of aluminum and aluminum alloy represents the average diameter of the particles. The texture of an object material surface is observed by a metal microscope, the number of crystal grains n existing in an area of 1 mm×1 mm is counted, and An average area S of crystal grains is calculated from the formula $S=(1\times10^6)/n(\mu m^2)$. At five positions in the metal microscope observation, crystal grains are counted, the average area of the crystal grains is used in the following formula (1), and the average is calculated, so that the average diameter d (μm) of crystal grains is determined. An assumed error is about 5 wt. %.

$$d=2(S/\pi)^{1/2} \quad (1)$$

The size of the crystal grains of aluminum foil or aluminum alloy foil varies widely depending on many factors, including a material composition, impurities, processing condition, heat treatment history, annealing condition and cooling condition. By properly combining and adjusting the factors in a manufacturing process, aluminum foil or aluminum alloy foil having an average diameter of crystal grains of 50 μm or less can be manufactured. The current collector may be manufactured from PACAL21 (registered trademark) manufactured by Nippon Foil Mfg. Co., Ltd.

Such an aluminum foil or aluminum alloy foil having an average diameter of crystal grains of 50 μm or less can increase the strength dramatically. An increase of the strength of the current collector improves the physical and chemical tolerance, therefore the current collector is highly resistance to breakdown. In particular, in a long cycle of overdischarge in a high temperature environment (40° C. or higher), rapid deterioration due to dissolution or corrosion of the current collector can be prevented, and resistance of the negative electrode is suppressed from increasing. Moreover, by suppressing a resistance increase of the negative electrode, Joule heat is lowered, and heat generation in the negative electrode can be suppressed.

By using the current collector made of aluminum foil or aluminum alloy foil having an average diameter of crystal grains of 50 μm or less, it is also effective to suppress deterioration due to dissolution or corrosion of the current collector by invasion of water in a long cycle in a high temperature and high humidity environment (40° C. or higher, and 80% or higher of humidity).

Further, an increase in the strength of the current collector makes it possible to, when manufacturing the negative electrode by suspending the negative electrode active material, conductive agent and binder in a proper solvent, applying the suspension on the current collector, and drying and pressing, prevent breakage of the current collector even if the press pressure is raised. As a result, a negative electrode of high density can be manufactured, and the capacity density can be enhanced. The higher density of the negative electrode makes it possible to increase heat conductivity, and to improve the heat releasing performance of the negative electrode. Moreover, by synergistic effects of suppression of heat generation in the battery and enhancement of heat releasing performance of the electrode, the elevation of battery temperature can be suppressed.

The thickness of the current collector is preferably 20 μm or less.

The active material in the negative electrode layer intercalates lithium ions at a potential of 0.4 V or more with respect to an electrode potential of lithium. That is, an open circuit potential for intercalating lithium ions of the active material is 0.4 V with respect to an open circuit potential of lithium metal. By using such an active material, pulverization due to on alloying reaction of aluminum (or aluminum alloy) and lithium can be suppressed even if members around the negative electrode, such as the current collector, lead, and terminal, are formed of aluminum (or aluminum alloy). In other words, as the material of the members around the negative electrode, aluminum (or aluminum alloy) can be used instead of copper used in the prior art. As a result, the battery voltage can be further elevated. In particular, the open circuit potential for intercalating lithium ions of the active material is preferably 0.4 to 3 V, more preferably 0.4 to 2 V with respect to the open circuit potential of lithium metal.

Examples of the active material include a metal oxide, metal sulfide, metal nitride, and metal alloy capable of intercalating lithium ions at the specified potential. Specific examples of the metal oxide include tungsten oxide ($WO_3$), amorphous tin oxide such as $SnB_{0.4}P_{0.6}O_{3.1}$, tin silicon oxide ($SnSiO_3$), and silicon oxide (SiO). Specific examples of the metal sulfide include lithium sulfide ($TiS_2$), molybdenum sulfide ($MoS_2$), and iron sulfide (FeS, $FeS_2$, $Li_xFeS_2$). Specific examples of the metal nitride include lithium cobalt nitride ($Li_xCo_yN$, $0<x<4.0$, $0<y<0.5$).

In particular, the active material is preferably a titanium-containing oxide such as a titanium-containing metal composite oxide or titanium oxide.

Examples of the titanium-containing metal composite oxide include titanium oxide not containing lithium when synthesizing the oxide, lithium titanium oxide, and lithium titanium composite oxide having part of constituent elements of the lithium titanium oxide replaced by dissimilar elements. Examples of the lithium titanium oxide include lithium titanate having a spinel structure (for example, $Li_{4+x}Ti_5O_{12}$, $0\leq x<3$), and lithium titanate of ramsdellite (for example, $Li_{2+y}Ti_3O_7$, $0\leq y\leq 3$). These examples of the lithium titanate are preferred because they are materials capable of intercalating lithium ions at a potential of about 1.5 V with respect to an electrode potential of lithium, and very stable electrochemically in the current collector made of aluminum foil or aluminum alloy foil.

Examples of the titanium oxide include $TiO_2$, or a metal composite oxide containing Ti and at least one element selected from the group consisting of P, V, Sn, Cu, Ni, Co and Fe. $TiO_2$ is preferably an anatase type and of low crystallinity upon a heat treatment temperature of 300 to 500° C. Examples of the metal composite oxide containing Ti and at least one element selected from the group consisting of P, V, Sn, Cu, Ni, Co and Fe include $TiO_2$—$P_2O_5$, $TiO_2$—$V_2O_5$, $TiO_2$—$P_2O_5$—$SnO_2$, $TiO_2$—$P_2O_5$—MeO (Me is at least one element selected from the group consisting of Cu, Ni, Co and Fe). The metal composite oxide is preferred to be a micro structure having both of a crystal phase and amorphous phase, or an amorphous phase alone. By such a micro structure, the cycle performance may be enhanced remarkably. In particular, a lithium titanium oxide and a metal composite oxide containing Ti and at least one element selected from the group consisting of P, V, Sn, Cu, Ni, Co and Fe are preferred.

In the active material, an average particle size of primary particles is preferred to be 1 μm or less, more preferably 0.3 μm or less. A particle size of an active material is measured in the following method by using a laser diffraction type particle size distribution measuring device (SALD-300 manufactured by Shimadzu Corporation). More specifically, about 0.1 g of a sample, a surface active agent, and 1 to 2 mL of distilled water are added to a beaker, and agitated sufficiently, and then, the mixture is put in an agitating water tank. A light intensity distribution is measured 64 times at intervals of 2 seconds by the laser diffraction type particle size distribution measuring device, and the average particle size of primary particles of an active material is determined by a method of analyzing particle size distribution data.

In the case of an active material of which the average particle size of primary particles is 1 μm or less, for example, an active material substance is preferred to be pulverized to a powder of 1 μm or less as an active material precursor at the time of reaction and synthesis, and it is obtained by grinding the baked power by a grinder such as a ball mill or jet mill to 1 μm or less.

By using such an active material of which the average particle size of primary particles is 1 μm or less, the cycle performance can be enhanced. In particular, this effect is outstanding in quick charging and high output discharging, and thus, it is ideal as a secondary battery having a high input and output performance for a vehicle. This is because, as the particle size becomes smaller in an active material for intercalating and deintercalating lithium ions, the specific surface area of secondary particles gathering primary particles is increased, and the diffusion distance of lithium ions becomes shorter in the active material, so that lithium ions can intercalate and deintercalate quickly.

In the manufacture of a negative electrode including the press process mentioned above, the load on the current collector increases as the average particle size of primary particles of the active material becomes smaller. Accordingly, when aluminum foil or aluminum alloy foil is used as the current collector, the current collector may be broken down in the press process, and the negative electrode performance is lowered. On the other hand, when the current collector is made from aluminum foil or aluminum alloy foil having an average diameter of crystal grains of 50 μm or less mentioned above, the strength of the current collector is enhanced. Consequently, even if the negative electrode is manufactured by using the active material having an average diameter of primary particles of 1 μm or less, breakdown of the current collector in the press process is avoided to make it possible to enhance the reliability, and to enhance the cycle characteristics in quick charging and high output discharging.

The conductive agent is, for example, a carbon material. Examples of the carbon material include acetylene black, carbon black, coke, carbon fiber, and graphite.

Examples of the binder include polytetrafluoroethylene (PTFE), polyvinylidene fluoride (PVdF), fluororubber, and styrene butadiene rubber.

A blending ratio of the active material, conductive agent, and binder in the negative electrode is preferably in a range of 80 to 95 wt. % of the active material, 3 to 20 wt. % of the conductive agent, and 2 to 7 wt. % of the binder.

A lead connected electrically to the current collector of the negative electrode is made of aluminum with a purity of 99 wt. % or more, or aluminum alloy with an aluminum purity of 99 wt. % or more. In particular, aluminum is preferred to be 99.9 wt. % or more in purity. The aluminum alloy preferably contains, for example, Mg, Fe and Si in a total of 0.7 wt. % or less with the balance substantially of aluminum. The lead is preferably a flexible foil or plate of 100 to 500 μm in thickness and 2 to 20 mm in width. Lead is not dissolved in an electrolyte solution in an overdischarged state, and is not broken even by vibration for a long period to allow a large current to flow. Consequently, long-term reliability and high output of the secondary battery can be maintained.

At least the surface of the negative electrode terminal connected to the lead is made of aluminum alloy which has a composition containing at least one metal selected from the group consisting of Mg, Cr, Mn, Cu, Si, Fe and Ni, having an aluminum purity of less than 99 wt. %, preferably aluminum purity of 90 wt. % or more and less than 99 wt. %. Such an aluminum alloy is higher in strength and corrosion resistance as compared with an aluminum of a purity of more than 99 wt. % or aluminum alloy of an aluminum purity of more than 99 wt. %. Of the metal, Mg and Cr contribute to enhancement of corrosion resistance of aluminum alloy, and Mn, Cu, Si, Fe and Ni contribute to enhancement of strength of aluminum alloy.

Specific configurations of the negative electrode terminal include the following.

(1) A negative electrode terminal is composed of a terminal body made of at least one metal selected from the group consisting of copper, iron and nickel, and a layer of aluminum alloy of the above-described composition, the layer being formed on the surface of the terminal body to which at least the lead is connected, for example, on the entire surface of the terminal body. Since this negative electrode terminal has a terminal body of iron, it is stronger than the aluminum alloy layer, thus the strength can be increased.

(2) A negative electrode terminal has a single structure composed of aluminum alloy of the above-described composition.

The aluminum alloy layer of (1) above is preferred to have a thickness of 10 to 300 μm. If the thickness of the aluminum alloy layer is less than 10 μm, connection reliability with the negative electrode lead may be lowered. If the thickness of the aluminum alloy layer is exceeds 300 μm, on the other hand, smoothness and uniformity of the aluminum alloy layer may be lowered. Examples of a method of forming the aluminum alloy layer includes a method of immersing the terminal body in a fused matter of aluminum alloy, a method of spraying aluminum alloy onto the terminal body, and a method of plating aluminum alloy only on the entire terminal. When forming an aluminum alloy layer only on the lead connection surface of the terminal body by these methods, a method of masking a region of the terminal body excluding the lead connection surface may be employed.

The aluminum alloy layer is preferred to have a composition containing at least one metal selected from the group consisting of 0.5 to 5 wt. % of Mg, 0.5 wt. % or less of Cr, 0.3 to 2.0 wt. % of Mn, 5 wt. % or less of Cu, 1 wt. % or less of Si, 1 wt. % or less of Fe, and 1 wt. % or less of Ni, with the balance substantially composed of Al. In particular, when it is desired to realize an aluminum alloy layer excellent in corrosion resistance, it is preferred to form it with a composition of Al—Mg alloy (Mg: 0.5 to 5 wt. %). If an aluminum alloy layer of higher corrosion resistance or strength is desired, it is preferred to contain, in addition to Mg, at least one metal selected from Mn, Cu, Si, Fe and Ni in, the composition by the above-described amount. Such an aluminum alloy layer is most preferred to have a composition containing 0.5 to wt. % of Mg, 0.3 to 2.0 wt. % of Mn, and 0.1 wt. % or less of at least one metal selected from Cu, Fe, Si and Cr, with the balance substantially composed of Al. A negative electrode terminal having such an aluminum alloy layer higher in corrosion resistance and strength can reduce the resistance at a connecting portion with the lead in a high temperature and high humidity environment, and even when assembled in a battery module, the connection resistance among adjacent batteries can be maintained at a low level.

When the aluminum alloy layer is formed by plating, it is preferred, due to restrictions of plating components, to compose it by using at least one metal selected from the group consisting of Cu, Fe, Si and Cr by 1.0 wt. % or less, the balance being Al.

The negative electrode terminal of a single structure composed of aluminum alloy of (2) above preferably has a composition comprising at least one metal selected from the group consisting of 0.5 to 5 wt. % of Mg, 0.5 wt. % or less of Cr, 0.3 to 2.0 wt. % of Mn, 5 wt. % or less of Cu, 1 wt. % or less of Si, 1 wt. % or less of Fe, and 1 wt. % or less of Ni, substantially with the balance of Al. In particular, from the viewpoint of enhancing the strength in addition to corrosion resistance, the negative electrode terminal is preferred to be composed of an aluminum alloy with a composition of Al with Mg (Mg: 0.5 to 5 wt. %) and the above-described amount of at least one metal selected from the group consisting of Mn, Cu, Si, Fe and Ni. The negative electrode terminal of this system is most preferred to be composed of aluminum alloy containing 0.5 to 5 wt. % of Mg, 0.3 to 2.0 wt. % of Mn, and 0.1 wt. % or less of at least one metal selected from the group consisting of Cu, Fe, Si and Cr, substantially with the balance of Al. The negative electrode terminal composed of such aluminum alloy enhanced in corrosion resistance and strength maintains a sufficient strength in a high temperature and high humidity environment, and can lower the resistance at a connection area with the negative electrode lead. In addition, even if such a terminal is assembled in a battery module, connection resistance among adjacent batteries can be maintained in a low state.

The shape of the negative electrode terminal is preferred to be a bolt of 3 to 30 mm in diameter.

2) Positive Electrode

The positive electrode includes a current collector, and a positive electrode layer held on one side or both sides of the current collector and having an active material, a conductive agent, and a binder.

The current collector is desired to be made of aluminum foil or aluminum alloy foil, with the average diameter of crystal grains of 50 μm or less, preferably 10 μm or less, as in the current collector of the negative electrode mentioned above. Such an aluminum foil or aluminum alloy foil having the average diameter of crystal grains of 50 μm or less can increase the strength dramatically. For this reason, when a positive electrode is fabricated by suspending the active material, conductive agent and binder in a proper solvent, applying the suspension on the current collector, and drying and pressing, breakage of the current collector can be prevented even if the press pressure is raised. As a result, a positive electrode of high density can be obtained, and the capacity density can be enhanced.

A thickness of the current collector is preferably 20 μm or less.

Examples of the active material in the positive electrode layer include an oxide, sulfide and polymer.

Examples of the oxide include manganese dioxide ($MnO_2$), iron oxide, copper oxide, nickel oxide, lithium manganese composite oxide (for example, $Li_xMn_2O_4$ or $Li_xMnO_2$), lithium nickel composite oxide (for example, $Li_xNiO_2$), lithium cobalt composite oxide ($LiCoO_2$), lithium nickel cobalt composite oxide (for example, $Li_xNi_{1-y}CO_yO_2$), lithium nickel manganese cobalt composite oxide (for example, $Li_xCO_{1-y-z}Mn_yNi_zO_2$), spinel type lithium manganese nickel composite oxide ($Li_xMn_{2-y}Ni_yO_4$), lithium phosphorus oxide having an olivin structure (for example, $Li_xFePO_4$, $Li_zFe_{1-y}Mn_yPO_4$, $Li_xCoPO_4$), iron sulfate ($Fe_2(SO_4)_3$), and vanadium oxide (for example, $V_2O_5$). Unless otherwise specified, x, y and z are preferably in a range of 0 to 1. The lithium nickel cobalt manganese composite oxide is particularly preferred to be composed of $Li_aNi_bCO_cMn_dO_2$ (where molar ratios a, b, c and d are in a range of $0 \leq a < 1.1$, $0.1 \leq b \leq 0.5$, $0 \leq c \leq 0.9$, and $0.1 \leq d \leq 0.5$).

Examples of the polymer include a conductive polymer material such as polyaniline and polypyrrole, and a disulfide polymer material. In addition, sulfur (S), carbon fluoride or the like may be used.

Preferable examples of the active material include lithium manganese composite oxide, lithium nickel composite oxide, lithium cobalt composite oxide, lithium nickel cobalt composite oxide, spinel type lithium manganese nickel composite oxide, lithium manganese cobalt composite oxide, iron lithium phosphate each high in battery voltage, and lithium nickel cobalt manganese composite oxide having a laminar crystal structure.

Examples of the conductive agent include acetylene black, carbon black, and graphite.

Examples of the binder include polytetrafluoroethylene (PTFE), polyvinylidene fluoride (PVdF), and fluororubber.

A blending ratio of the active material, conductive agent, and binder in the positive electrode layer is preferably in a range of 80 to 95 wt. % of the active material, 3 to 20 wt. % of the conductive agent, and 2 to 7 wt. % of the binder.

3) Separator

Examples of the separator include a synthetic resin unwoven fabric, a polyethylene porous film, a polypropylene porous film, and an aramid porous film.

4) Outer Container

The outer container is composed of a cylindrical metal can with a bottom, and a metal lid bonded and fixed to an opening of the metal can by, for example, welding. Preferably, the metal can and lid are composed of aluminum or aluminum alloy due to the purpose of reduction of weight and resistance of corrosion. An average diameter of crystal grains of the aluminum or aluminum alloy is preferably 50 μm or less, more preferably 10 μm or less. The metal can composed of such aluminum or aluminum alloy having the average diameter of crystal grains of 50 μm or less can increase the strength dramatically, and thus, the thickness can be reduced. As a result, the heat release performance is improved, which suppresses elevation of battery temperature. Since the thickness of the metal can is reduced, and the deposit of an electrode group including a contained positive electrode, separator and negative electrode is effectively increased, the energy density is increased. Accordingly, the battery is reduced in weight and size. These features are particularly preferred for batteries used under demanding high temperature and high energy density etc. conditions, such as an on-board secondary battery.

The aluminum alloy for use in the outer container is preferred to contain at least one metal selected from the group consisting of Mg, Mn and Fe. The metal can of the outer container composed of such aluminum alloy is further enhanced in strength, and the wall thickness can be reduced to 0.3 mm or less.

In the square nonaqueous electrolyte secondary battery according to the first embodiment, terminals of the negative electrode and positive electrode are mounted, for example, on the lid of the outer container so as to be insulated electrically. However, the negative electrode terminal can be electrically connected to the outer container.

5) Nonaqueous Electrolyte

Examples of the nonaqueous electrolyte include a liquid nonaqueous electrolyte prepared by dissolving an electrolyte in an organic solvent, a gel nonaqueous electrolyte obtained by compounding the liquid electrolyte and a polymer material, and a solid nonaqueous electrolyte obtained by compounding a lithium salt electrolyte and a polymer material. As the nonaqueous electrolyte, an ionic liquid containing lithium ions may be used.

The liquid nonaqueous electrolyte is prepared by dissolving an electrolyte in an organic solvent at concentration of 0.5 to 3 mol/L.

Examples of the electrolyte include at least one selected from the group consisting of $LiBF_4$, $LiPF_6$, $LiAsF_6$, $LiClO_4$, $LiCF_3SO_3$, $LiN(CF_3SO_2)_2$, $LiN(C_2F_5SO_2)_3C$, and $LiB[(OCO)_2]_2$. Among these electrolytes, $LiBF_4$ is high in corrosiveness, but is preferred because it is excellent in thermal and electrochemical stability, and is less degradable. Furthermore, it is desirable to use an electrolyte which is electrochemically stable under a high potential. Such the electrolyte is at least one selected from the group consisting of $LiPF_6$ and $LiBF_4$.

Examples of the organic solvent include cyclic carbonate such as propylene carbonate (PC) and ethylene carbonate (EC); chain carbonate such as diethylel carbonate (DEC), dimethyl carbonate (DMC), and methyl ethyl carbonate (MEC); chain ether such as dimethoxy ethane (DME) and diethoxy ethane (DEE); cyclic ether such as tetrahydrofuran (THF) and dioxolane (DOX); γ-butyrolactone (GBL), acetonitrile (AN), and sulfolane (SL). These organic solvents may be used either alone or in a mixture. It is desirable to use at least one of organic solvent selected from the group consisting of propylene carbonate, ethylene carbonate and γ-buthyrolactone, because it has a high boiling point and a high ignition point, and is excellent in thermal stability. It is more desirable to use γ-buthyrolactone as an organic solvent.

It is desirable to use a nonaqueous electrolyte containing at least one of organic solvent selected from the group consisting of propylene carbonate, ethylene carbonate and γ-buthyrolactone, and an electrolyte selected from the group consisting of $LiPF_6$ and $LiBF_4$, because it has a high boiling point and a high ignition point, and is excellent in thermal and electrochemical stability.

Examples of the polymer material include polyvinylidene fluoride (PVdF), polyacrylonitrile (PAN), and polyethylene oxide (PEO).

The ionic liquid is composed of a lithium ion, organic cation, and organic anion, and it is in a liquid form at 100° C. or less, or at room temperature or less depending on the condition.

Now, the square nonaqueous electrolyte secondary battery according to the first embodiment will be specifically explained with reference to FIGS. 1 to 3.

A square nonaqueous electrolyte secondary battery 20 comprises an outer container 1 formed of, for example, aluminum alloy. The outer container 1 includes a rectangular cylindrical metal can 2 with a bottom, and a square flat lid 3 bonded airtightly to an upper end opening of the metal can 2 by, for example, laser welding. The lid 3 has holes 4, 5 for holding a negative electrode terminal and a positive electrode terminal which will be described later.

A laminated electrode group 6 is contained in the metal can 2 of the outer container 1. The laminated electrode group 6 has a structure in which plural negative electrodes 8 and positive electrodes 9 are inserted and laminated alternately in folded parts of a separator 7 folded like a hairpin as shown in FIG. 3, and the ends of the separator 7 are wound so as to cover the outer side of a rectangular columnar laminated body. Such a laminated electrode group 6 is inserted and contained in the metal can 2 such that the hairpin folded sides of the separator 7 may be at the upper and lower ends. An insulating plate 10 is arranged between the inside of the bottom of the metal can 2 and the lower end face of the laminated electrode group 6. A nonaqueous electrolyte is contained in the metal can 2 in which the laminated electrode group 6 is located.

A tubular insulating member 11 having circular flanges at both ends thereof is fitted into the hole 4 of the lid 3. For example, a bolt-shaped negative electrode terminal 12 is inserted in the tubular insulating member 11 with its head positioned in the metal can 2, and its threaded portion projects outside from the lid 3. A nut 13 made of, for example, aluminum alloy is screwed into the projecting threaded portion of the negative electrode terminal 12 by way of a washer (not shown) made of aluminum alloy, and the negative electrode terminal 12 is insulatedly fixed to the lid 3. The negative electrode terminal 12 is formed of, for example, aluminum alloy with an aluminum purity of less than 99 wt. %, containing at least one metal component selected from the group consisting of Mg, Cr, Mn, Cu, Si, Fe and Ni.

A tubular insulating member 14 having circular flanges at both ends thereof is fitted into the hole 5 of the lid 3. For example, a bolt-shaped positive electrode terminal 15 is inserted in the tubular insulating member 14 with its head positioned in the metal can 2, and its threaded portion projects outside from the lid 3. A nut 16 made of, for example, aluminum alloy is screwed into the projecting threaded portion of the positive electrode terminal 15 by way of a washer (not shown) made of aluminum alloy, and the positive electrode terminal 15 is insulatedly fixed to the lid 3. The positive electrode terminal 15 is made of, for example, aluminum alloy containing a metal such as Mg, Cr, Mn, Cu, Si, Fe and Ni.

A plurality of belt-like negative electrode leads 17 composed of foils or plates have one ends respectively connected to the negative electrodes 8 of the laminated electrode group 6 by, for example, resistance welding, and the other ends gathered and connected to the lower end face of the negative electrode terminal 12 by, for example, resistance welding. Like the negative electrode lead 17, a plurality of belt-like positive electrode leads 18 composed of foils or plates have one ends respectively connected to the positive electrodes 9 of the laminated electrode group 6 by, for example, resistance welding, and the other ends gathered and connected to the lower end face of the positive electrode terminal 15 by, for example, resistance welding. The negative electrode leads 17 and positive electrode leads 18 are made of aluminum with a purity of 99 wt. % or more, or aluminum alloy with an aluminum purity of 99 wt. % or more.

Figure 2:
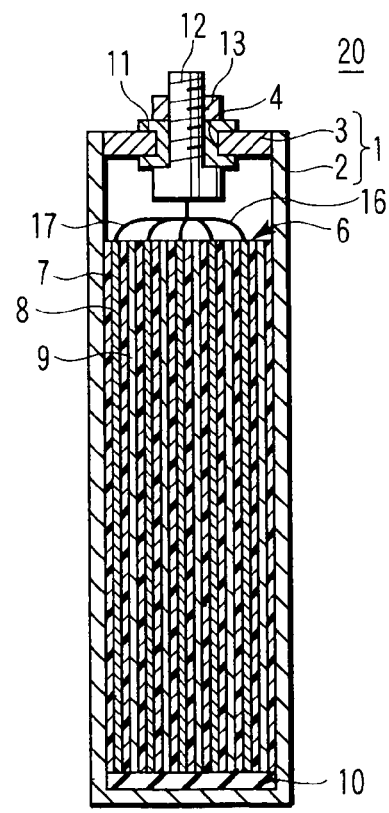
FIG. 2 is a sectional view across a negative electrode terminal of the secondary battery in FIG. 1.
Figure 4:
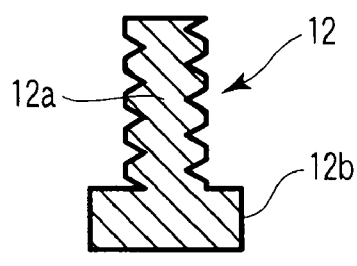
FIG. 4 is a sectional view showing another configuration of the negative electrode for use in the square nonaqueous electrolyte secondary battery according to the first embodiment.
Figure 5:
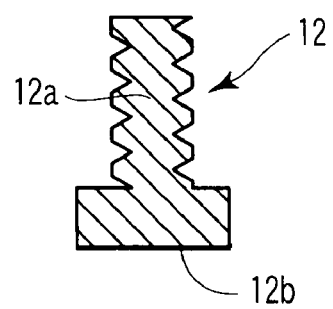
FIG. 5 is a sectional view of a further another configuration of the negative electrode for use in the square nonaqueous electrolyte secondary battery according to the first embodiment.

The negative electrode terminal 12 is not limited to a single structure formed of aluminum alloy of the composition shown in FIG. 1 or FIG. 2. As shown in FIG. 4, the negative electrode terminal 12 may have a structure in which the entire outer surface of a bolt-like terminal body 12a composed of at least one metal selected from the group consisting of copper, iron and nickel, is coated with a layer 12b of aluminum alloy with aluminum purity of less than 99 wt. % containing at least one metal selected from the group consisting of Mg, Cr, Mn, Cu, Si, Fe and Ni. Or, as shown in FIG. 5, the negative electrode terminal 12 may be composed such that the lead connection side (lower end face) of the bolt-like terminal body 12 is covered with the aluminum alloy layer 12b.

A battery module according to the first embodiment will be explained below.

The battery module according to the first embodiment has a structure in which a plurality of the square nonaqueous electrolyte secondary batteries are connected.

The secondary batteries can be connected by series connection, parallel connection or series-parallel combined connection.

The battery module according to the first embodiment will be specifically described with reference to FIG. 6. The battery module has a structure in which a plurality of, for example, five square nonaqueous electrolyte secondary batteries 20 shown in FIGS. 1 and 2 are arranged in one direction, and terminals 15, 12 of the positive and negative electrodes of the secondary batteries are mutually connected in series by using connection leads 21 to 24 made of, for example, Cu. The positive electrode terminal 15 of the leftmost secondary battery 20 is connected to a positive electrode pickup lead 25, and the negative electrode terminal 12 of the rightmost secondary battery 20 is connected to a negative electrode pickup lead 26.

The square nonaqueous electrolyte secondary battery according to the first embodiment includes a negative electrode having an active material for intercalating lithium ions at a potential of 0.4 V or more with respect to an electrode potential of lithium. The negative electrode has an internal resistance of 10 mΩ or less as an alternating-current impedance value of 1 kHz, that is, a discharge capacity of 2 Ah or more. A lead for electrically connecting the negative electrode and the negative electrode terminal is formed of aluminum with a purity of 99 wt. % or more, or aluminum alloy with an aluminum purity of 99 wt. % or more. Further, at least the surface of the negative electrode terminal which is connected to the lead is formed of aluminum alloy with an aluminum purity of less than 99 wt. % containing at least one metal selected from the group consisting of Mg, Cr, Mn, Cu, Si, Fe and Ni.

Use of such a negative electrode having an active material for intercalating lithium ions at a specific potential provides the following advantage. That is, even if the members around the negative electrode such as the current collector, lead and terminal are made of aluminum (or aluminum alloy), it is possible to suppress pulverization due to an alloying reaction of the aluminum (or aluminum alloy) and lithium. More specifically, the negative electrode lead can be made of aluminum or aluminum alloy of low resistance, and at least the lead connecting portion of the negative electrode terminal can be made of aluminum alloy of low resistance containing a specific metal.

At least the surface of the negative electrode terminal which is connected to the lead is formed of aluminum alloy with an aluminum purity of less than 99 wt. % containing at least one metal selected from the group consisting of Mg, Cr, Mn, Cu, Si, Fe and Ni. Consequently, the strength and corrosion resistance of the connecting portion with the negative electrode lead are enhanced as compared with the case of forming the surface by using aluminum with a purity of more than 99 wt. %, or aluminum alloy with a purity of more than 99 wt. %. In particular, when at least the surface of the negative electrode terminal which is connected to the lead is formed of aluminum alloy comprising 0.5 to 5 wt. % of Mg, 0.3 to 2.0 wt. % of Mn, and 0.1 wt. % of at least one metal selected from Cu, Fe, Si and Cr, with the balance substantially composed of Al, the strength and corrosion resistance of the connecting portion between the negative electrode terminal and the lead are further enhanced.

As a result, even if the secondary battery is exposed to vibration or impact, breakage of the connecting portion between the negative electrode terminal and the lead can be suppressed, and a high reliability is assured.

Even if the connecting portion between the negative electrode terminal and the lead is exposed to an overdischarge operation or high temperature and high humidity environment during a log period of use, corrosion and dissolving reaction of the connecting portion can be prevented, and a low resistance connection can be maintained. For this reason, a high output can be obtained, and without causing elevation of impedance in high output discharge, a sufficient discharge reaction of the positive electrode and negative electrode is assured to enhance the utility rate of the active material.

Moreover, the corrosion resistance of the connecting portion between the negative electrode terminal and the lead can be enhanced. As result, as the electrolyte of the nonaqueous electrolyte, it is possible to use $LiBF_4$ which is very corrosive, but excellent in thermal and chemical stability, and is less degradable. Consequently, high output can be obtained more stably.

Therefore, the connection reliability between the negative electrode terminal and the lead is enhanced under the conditions of a high temperature and high humidity environment for a long period, quick charging, overdischarging, and high output discharge. As a consequence, it is possible to provide a square nonaqueous electrolyte secondary battery having an excellent cycle performance and output characteristics and high reliability.

By connecting and combining the plurality of square nonaqueous electrolyte secondary batteries described above, favorable capacity balance can be maintained in a individual secondary batteries under the conditions of high temperature and high humidity environment for a long period, quick charging, overdischarging, and high output discharge, which makes it possible to provide a battery module excellent in cycle performance and output characteristics.

Second Embodiment

A square nonaqueous electrolyte secondary battery according to a second embodiment comprises a metal outer container serving also as a negative electrode terminal, a nonaqueous electrolyte contained in the container, a positive electrode contained in the container, a negative electrode contained in the container and having an active material for intercalating lithium ions at a potential of 0.4 V or more with respect to an electrode potential of lithium, and a separator interposed between the negative electrode and the positive electrode. A negative electrode lead has one end connected to the negative electrode, and the other end connected to the inner surface of the outer container. The negative electrode lead is made of aluminum with a purity of 99 wt. % or more, or aluminum alloy with an aluminum purity of 99 wt. % or more. In the outer container to which such a negative electrode lead is connected, at least the inner surface, which is connected to the negative electrode terminal, is formed of aluminum alloy with an aluminum purity of less than 99 wt. % containing at least one metal selected from the group consisting of Mg, Cr, Mn, Cu, Si, Fe and Ni. The positive electrode is connected to a positive electrode terminal fitted, for example, to the container through a lead. Such a secondary battery has an internal resistance of about 10 mΩ or less as an alternating-current impedance value of 1 kHz. That is, the secondary battery has a large discharge capacity of, for example, 2 Ah or more.

Now, the outer container will be specifically described. Note that the negative electrode, positive electrode, separator, and nonaqueous electrolyte are the same as those explained in the first embodiment.

The outer container includes a cylindrical metal can with a bottom, and a metal lid bonded and fixed to an opening of the metal can by, for example, welding. More specifically, the negative electrode lead is connected to either the inner surface of the metal can or the lid composing the outer container. In the outer container having such a configuration, at least the inner surface to which the negative electrode terminal is connected is made of aluminum alloy which has a composition containing at least one metal selected from the group consisting of Mg, Cr, Mn, Cu, Si, Fe and Ni, having an aluminum purity of less than 99 wt. %, preferably aluminum alloy with an aluminum purity of 90 wt. % or more and less than 99 wt. %. Such an aluminum alloy can enhance the strength and corrosion resistance as compared with aluminum with a purity of more than 99 wt. %, or aluminum alloy with a purity of more than 99 wt. %. Of the metals, Mg and Cr contribute to corrosion resistance of aluminum alloy, and Mn, Cu, Si, Fe and Ni contribute to enhance the strength of aluminum alloy.

Specific configurations of the outer container include the following.

(1) An outer container is made of aluminum or aluminum alloy, and has a layer of aluminum alloy of the above-described composition, the layer being formed on at least the inner surface to which the negative electrode lead is connected, for example, on the entire inner surface. In particular, when the negative electrode lead is connected to the lid of the outer container in consideration of the convenience of assembling the secondary battery, a structure having a layer of aluminum alloy of the above-described composition in the inner surface of the lid is preferable.

(2) An outer container is composed of a metal can, and a metal lid joined to an opening of the metal can. At least the metal can and the lid is made of aluminum alloy of the above-described composition.

The aluminum alloy layer in (1) above is preferred to have a thickness of 10 to 300 μm. If the thickness of the aluminum alloy layer is less than 10 μm, the connection reliability with the lead may be lowered. If the thickness of the aluminum alloy layer exceeds 300 μm, on the other hand, smoothness and uniformity of the aluminum alloy layer may be lowered. Examples of a method of forming the aluminum alloy layer include a method of immersing aluminum alloy in a fused matter, a method of spraying aluminum alloy, and a method of plating aluminum alloy. When the aluminum alloy layer is formed only in the lead connection inner surface of the outer container by these methods, the area of the outer container excluding the lead connection surface may be protected by masking.

The aluminum alloy layer is preferably composed of at least one metal selected from the group consisting of 0.5 to 5 wt. % of Mg, 0.5 wt. % or less of Cr, 0.3 to 2.0 wt. % of Mn, 5 wt. % or less of Cu, 1 wt. % or less of Si, 1 wt. % or less of Fe, and 1 wt. % or less of Ni, with the balance substantially composed of Al. In particular, when it is desired to realize an aluminum alloy layer particularly excellent in corrosion resistance, it is preferred to form it with a composition of Al—Mg alloy (Mg: 0.5 to 5 wt. %). If an aluminum alloy layer of higher corrosion resistance or strength is desired, it is preferred to contain, in addition to Mg, at least one metal selected from the group consisting of Mn, Cu, Si, Fe and Ni in the composition by the above-described amount. Such an aluminum alloy layer is most preferred to have a composition of 0.5 to 5 wt. % of Mg, 0.3 to 2.0 wt. % of Mn, and 0.1 wt. % or less of at least one metal selected from the group consisting of Cu, Fe, Si and Cr, with the balance substantially composed of Al. The outer container having such an aluminum alloy layer higher in corrosion resistance and strength can reduce the resistance at the connecting portion with the lead in a high temperature and high humidity environment, and even when assembled in a battery module, the connection resistance among adjacent cells can be maintained at a low level.

When the aluminum alloy layer is formed by plating, it is preferred, due to restrictions of plating components, to compose it by using at least one metal selected from the group consisting of Cu, Fe, Si and Cr by 1.0 wt. % or less, with the balance substantially of Al.

In addition, when in the outer container composed of aluminum alloy of (2) above, both the metal can and lid as constituent members are made of aluminum alloy of the above-described composition containing a metal such as Mn, the metal can and lid may be made of the same composition or different compositions. The outer container preferably has a composition comprising at least one metal selected from the group consisting of 0.5 to 5 wt. % of Mg, 0.5 wt. % or less of Cr, 0.3 to 2.0 wt. % of Mn, 5 wt. % or less of Cu, 1 wt. % or less of Si, 1 wt. % or less of Fe, and 1 wt. % or less of Ni, with the balance substantially of Al. In particular, due to purpose of enhancing the strength of the outer container in addition to corrosion resistance, the outer container is preferred to be formed of aluminum alloy in a composition of Al with Mg (Mg: 0.5 to 5 wt. %) and the above-described amount of at least one metal selected from Mn, Cu, Si, Fe and Ni. The outer container of this alloy system is most preferred to be formed of aluminum alloy comprising 0.5 to 5 wt. % of Mg, 0.3 to 2.0 wt. % of Mn, and 0.1 wt. % or less of at least one metal selected from the group consisting of Cu, Fe, Si and Cr, with the balance substantially of Al. The outer container composed of such an aluminum alloy enhanced in corrosion resistance and strength maintains a sufficient strength in a high temperature and high humidity environment, and can lower the resistance at the connecting portion with the negative electrode lead. Hence, when assembled in a battery module, the connection resistance among adjacent cells can be maintained in a low state.

In the metal can composing the outer container, it is desired to determine the composition of aluminum alloy in consideration of the processability of forming a can shape, in addition to corrosion resistance and strength.

A negative electrode terminal for connection with an external lead may be directly connected electrically to the outer container. In such a configuration, the negative electrode terminal may be installed in any position of the outer container. More preferably, the negative electrode terminal is directly connected to the lid of the outer container from the viewpoint of design of the secondary battery.

In the square nonaqueous electrolyte secondary battery according to the second embodiment, the positive electrode terminal is connected to the lid of the outer container, for example, by electrical insulation.

Figure 7:
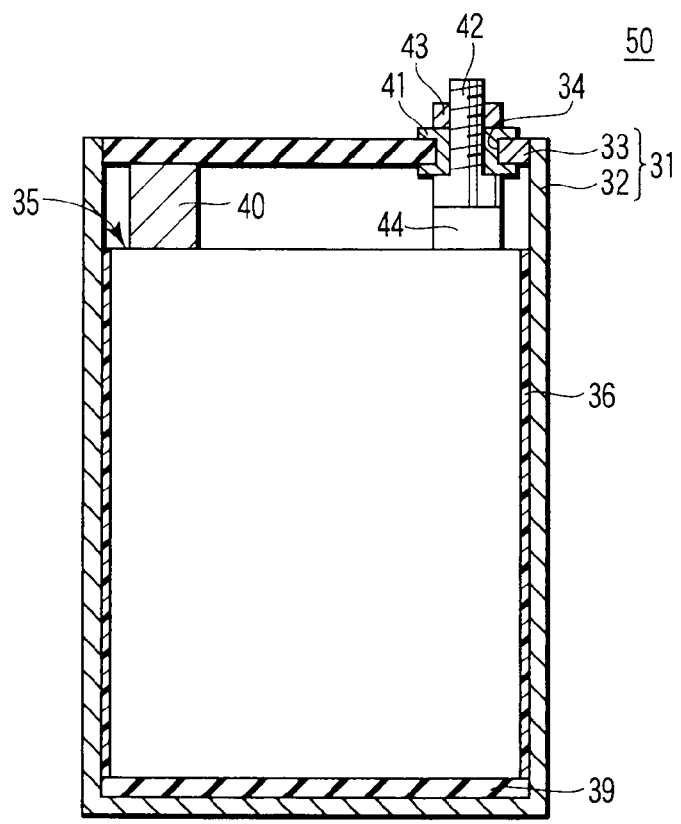
FIG. 7 is a sectional view showing a square nonaqueous electrolyte secondary battery according to a second embodiment.
Figure 8:
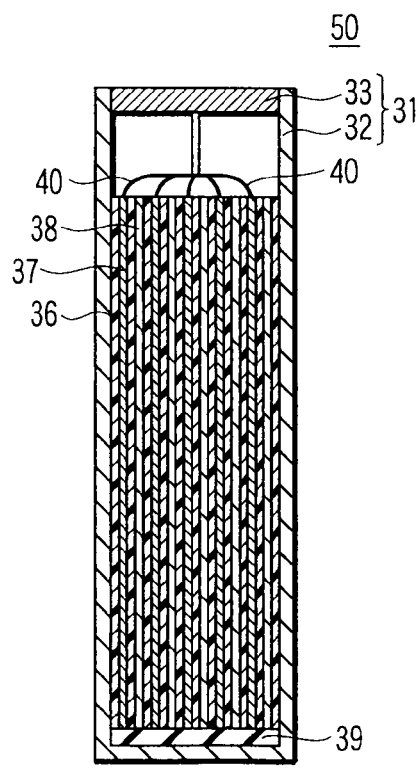
FIG. 8 is a sectional view across a negative electrode lead of the secondary battery in FIG. 7.

Now, the square nonaqueous electrolyte secondary battery according to the second embodiment will be specifically explained with reference to FIGS. 7 and 8.

A square nonaqueous electrolyte secondary battery 50 comprises an outer container 31. The outer container 31 includes a rectangular cylindrical metal can 32 with a bottom and a square flat lid 33. The metal can 32 is made of aluminum alloy with an aluminum purity of less than 99% containing at least one metal selected from the group consisting of Mg, Cr, Mn, Cu, Si, Fe and Ni. The lid 33 is made of the same aluminum alloy and bonded airtightly to an upper end opening of the metal can 32 by, for example, laser welding. The lid 33 has a hole 34 for holding a positive electrode terminal which will be described later.

A laminated electrode group 35 is contained in the metal can 32 of the outer container 31. The laminated electrode group 35 is composed as shown in FIG. 3. That is, the laminated electrode group 35 has a structure in which a plurality of negative electrodes 37 and positive electrodes 38 are alternately inserted and laminated in folded parts of a separator 36 of the laminated electrode group 35 folded like a hairpin, and the ends of the separator 36 are wound so as to cover the outer side of a rectangular columnar laminated body. Such a laminated electrode group 35 is inserted and contained in the metal can 32 such that the hairpin folded sides of the separator 36 may be at the upper and lower ends. An insulating plate 39 is arranged between the inside of the bottom of the metal can 32 and the lower end face of the laminated electrode group 35. A nonaqueous electrolyte is contained in the metal can 32 in which the laminated electrode group 35 is located.

A plurality of belt-like negative electrode leads 40 composed of foils or plates have one ends connected to the negative electrodes 37 of the laminated electrode group 35 by, for example, resistance welding, and the other ends gathered and connected to the inner surface of the lid 33 of the outer container 31 by, for example, resistance welding. The negative electrode lead 40 is made of aluminum with a purity of 99 wt. % or more, or aluminum alloy with an aluminum purity of 99 wt. % or more.

A tubular insulating member 41 having circular flanges at both ends thereof is fitted into the hole 34 of the lid 33. For example, a bolt-shaped positive electrode terminal 42 is inserted in the tubular insulating member 41 with its head positioned in the metal can 32, and its threaded portion projects outside from the lid 33. A nut 43 made of, for example, aluminum alloy is screwed into the projecting threaded portion of the positive electrode terminal 42 by way of a washer (not shown) made of aluminum alloy, and the positive electrode terminal 42 is insulatedly fixed to the lid 33. A plurality of belt-like positive electrode leads 44 composed of foils or plates have one ends connected to the positive electrodes 38 of the laminated electrode group 35 by, for example, resistance welding, and the other ends gathered and connected to the lower end face of the positive electrode terminal 42 by, for example, resistance welding. The positive electrode lead 44 is made of aluminum with a purity of 99 wt. % or more, or aluminum alloy with an aluminum purity of 99 wt. % or more.

A battery module according to the second embodiment will be explained below.

The battery module according to the second embodiment is composed by connecting a plurality of the square nonaqueous electrolyte secondary batteries described above.

The secondary batteries can be connected by series connection, parallel connection or series-parallel combined connection.

Such a battery module according to the embodiment will be specifically described with reference to FIG. 9. The battery module has a structure in which a plurality of, for example, five square nonaqueous electrolyte secondary batteries 50 shown in FIGS. 6 and 7 are arranged in one direction, and the positive electrode terminal 42 of the secondary batter 50 and the lid 33 of the outer container 31 serving also as a negative electrode terminal are mutually connected in series by using connection leads 51 to 54 made of, for example, Cu. The positive electrode terminal 42 of the leftmost secondary battery 50 is connected to a positive electrode pickup lead 55, and the lid 33 serving also as a negative electrode terminal of the rightmost secondary battery 50 is connected to a negative electrode pickup lead 56.

The square nonaqueous electrolyte secondary battery according to the second embodiment includes a negative electrode having an active material for intercalating lithium ions at a potential of 0.4 V or more with respect to an electrode potential of lithium. The negative electrode has an internal resistance of 10 mΩ or less as an alternating-current impedance of 1 kHz, that is, a discharge capacity of 2 Ah or more. A negative electrode lead for electrically connecting the negative electrode and the outer container serving as a negative electrode terminal is made of aluminum with a purity of 99 wt. % or more, or aluminum alloy with an aluminum purity of 99 wt. % or more. Further, at least the inner surface of the outer container which is connected to the lead is formed of aluminum alloy with an aluminum purity of less than 99 wt. % containing at least one metal selected from the group consisting of Mg, Cr, Mn, Cu, Si, Fe and Ni.

Use of such a negative electrode having an active material for intercalating lithium ions at a specific potential provides the following advantage. That is, even if the members around the negative electrode such as the current collector, lead and terminal are formed of aluminum (or aluminum alloy), it is possible to suppress pulverization due to an alloying reaction of the aluminum (or aluminum alloy) and lithium. More specifically, since the negative electrode lead can be formed of aluminum or aluminum alloy of low resistance, the outer container can be formed of aluminum or aluminum alloy, and can be connected to the negative electrode lead. In other words, the outer container serves also as a negative electrode terminal. As a result, the outer container can be formed of aluminum alloy of low resistance containing a specific metal, at least in the portion connecting with the lead, as in the negative electrode terminal of the first embodiment.

At least the inner surface of the outer container which is connected to the lead is made of aluminum alloy with an aluminum purity of less than 99 wt. % containing at least one metal selected from the group consisting of Mg, Cr, Mn, Cu, Si, Fe and Ni. Consequently, the strength and corrosion resistance of the connecting portion with the negative electrode lead can be enhanced as compared with the case of forming the connecting portion by using aluminum with a purity of more than 99 wt. %, or aluminum alloy with an aluminum purity of more than 99 wt. %. In particular, when at least the inner surface of the outer container which is connected to the lead is formed of aluminum alloy comprising 0.5 to 5 wt. % of Mg, 0.3 to 2.0 wt. % of Mn, and 0.1 wt. % of at least one metal selected from the group consisting of Cu, Fe, Si and Cr, with the balance substantially composed of Al, the strength and corrosion resistance of the connecting portion between the outer container serving as a negative electrode terminal and the lead are further enhanced. In particular, by forming the metal can composing the outer container by using aluminum alloy of the above-described composition, the strength of the metal can is enhanced. In addition, since the strength is increased, the wall thickness can be reduced.

As a result, even if the secondary battery is exposed to vibration or impact, breakage of the connecting portion between the outer container serving as a negative electrode terminal and the negative electrode lead can be suppressed, and a high reliability is assured.

Even if the connecting portion between the outer container and the negative electrode lead is exposed to an overdischarge operation or high temperature and high humidity environment during a log period of use, a corrosion and dissolving reaction can be prevented at the connecting portion, and low resistance connection can be maintained. For this reason, a high output can be obtained, and without causing elevation of impedance in high output discharge, a sufficient discharge reaction of the positive electrode and negative electrode is assured, and the utility rate of the active material is enhanced.

Further, corrosion resistance of the connecting portion between the outer container and the negative electrode lead can be enhanced. As result, as the electrolyte of the nonaqueous electrolyte, it is possible to use $LiBF_4$ which is very corrosive, but excellent in thermal and chemical stability, and is less degradable. Consequently, a high output can be obtained more stably.

Therefore, the connection reliability between the outer container serving as a negative electrode terminal and the lead is enhanced under the conditions of a high temperature and high humidity environment for a long period, quick charging, overdischarging, and high output discharge. This makes it possible to provide a square nonaqueous electrolyte secondary battery having an excellent cycle performance and output characteristics and high reliability.

By connecting and combining a plurality of the square nonaqueous electrolyte secondary batteries described above, a favorable capacity balance is maintained in individual secondary batteries under the conditions of a high temperature and high humidity environment for a long period, quick charging, overdischarging, and high output discharge. Accordingly, it is possible to provide a battery module excellent in cycle performance and output characteristics.

Now, examples of the invention will be described. The invention is not limited to the following examples alone, but may be changed and modified freely within the scope not departing from the true spirit thereof.

Example 1

Preparation of Negative Electrode

Lithium titanate ($Li_4Ti_5O_{12}$) having an average diameter of primary particles of 0.5 μm, and specific surface area of BET by $N_2$ gas of 20 m$^2$/g as an active material, carbon powder having an average particle size of 4 μm as a conductive agent, and polyvinylidene fluoride (PVdF) as a binder were blended by 90:7:3 by weight, and the mixture was dispersed in an n-methyl pyrrolidone (NMP) solvent to prepare a slurry. The slurry was applied to an aluminum alloy foil (current collector) to a thickness of 15 μm, with an average diameter of crystal grains of 50 μm, and purity of 99 wt. %, and dried, pressed, and cut to prepare 60 plates of negative electrodes with a size of 140 mm×330 mm and electrode density of 2.5 g/cm$^3$. A belt-like lead made of aluminum foil with a width of 10 mm, a length of 30 mm, thickness of 200 μm, and purity of 99.9 wt. % was bonded to one end of the current collector of each of the negative electrodes by resistance welding.

Preparation of Positive Electrode

Lithium cobalt oxide ($LiCoO_2$) as an active material, graphite powder as a conductive agent, and polyvinylidene fluoride (PVdF) as a binder were blended by 87:8:5 by weight, and the mixture was dispersed in a n-methylpyrrolidone (NMP) solvent to prepare a slurry. The slurry was applied to an aluminum alloy foil (current collector) to a thickness of 15 μm, with an average diameter of crystal grains of 10 μm, and purity of 99 wt. %, and dried, pressed, and cut to prepare 61 plates of positive electrodes with a size of 140 mm×330 mm and electrode density of 3.5 g/cm$^3$. A belt-like lead made of aluminum foil with a width of 10 mm, a length of 30 mm, thickness of 200 μm, and purity of 99.9 wt. % was bonded to one end of the current collector of each of the positive electrodes by resistance welding.

Preparation of Lid with Terminal

In a lid made of aluminum alloy with a length of about 141.6 mm, a width of about 14.6 mm, thickness of 0.3 mm, comprising 1.6 wt. % of Mg, 1 wt. % of Mn, 0.4 wt. % of Fe, and the balance substantially of Al, holes for holding a negative electrode terminal and a positive electrode terminal were opened. A tubular insulating member having circular flanges at both ends thereof was fitted in each hole of the lid. A bolt-like negative electrode terminal with a head diameter of 10 mm was inserted in the tubular insulating member of the lid, and its threaded portion was protruded to the lid side opposite to the head. A bolt made of aluminum alloy was screwed in to the threaded portion through a washer made of aluminum alloy, so that the negative electrode terminal was fixed to the lid through one tubular insulating member. The negative electrode terminal was formed of aluminum alloy comprising 1 wt. % of Mg, 0.6 wt. % of Si, 0.25 wt. % of Cu, and the balance substantially of Al. Subsequently, a bolt-like positive electrode terminal with a head diameter of 10 mm was inserted in the other tubular insulating member of the lid, and its threaded portion was protruded to the lid side opposite to the head. A bolt made of aluminum alloy was screwed in this threaded portion through a washer made of aluminum alloy, so that the positive electrode terminal was fixed to the lid through the tubular insulating member. The positive electrode terminal was formed of aluminum alloy comprising 1 wt. % of Mg, 0.6 wt. % of Si, 0.25 wt. % of Cu, and the balance substantially of Al.

The bolt and washer were formed of aluminum alloy comprising 1 wt. % of Mg, 0.6 wt. % of Si, 0.25 wt. % of Cu, and the balance substantially of Al.

Assembling of Secondary Battery

Figure 3:
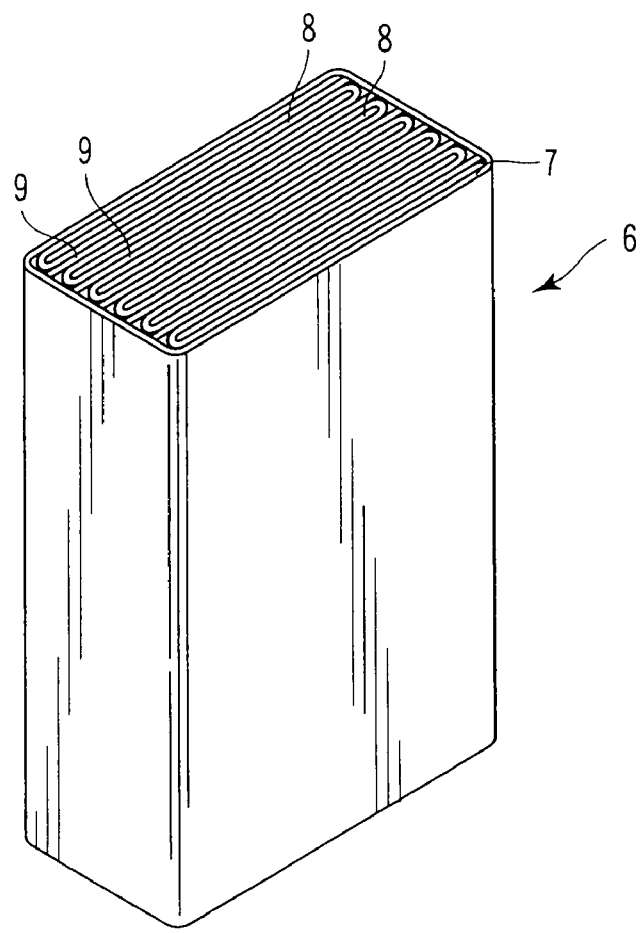
FIG. 3 is a perspective view showing a laminated electrode group contained in an outer container in FIG. 1.

In folded portions of a separator composed of a polyethylene porous film of 12 μm in thickness folded like a hairpin, the 60 negative electrodes bonded with negative electrode leads and the 61 positive electrodes bonded with positive electrode leads were alternately inserted and laminated, and ends of the separator were wound so as to cover the outer side of a rectangular columnar laminated body to prepare an electrode group 2 as shown in FIG. 3. The laminated electrode group was further pressed and molded, and then inserted into a rectangular tubular metal can with the bottom. The metal can was formed of aluminum alloy comprising 1.6 wt. % of Mg, 1 wt. % of Mn, 0.4 wt. % of Fe, and the balance substantially of Al, and was cut in a size of 335 mm in height, 142 mm in length, 15 mm in width, and 0.2 mm in thickness. Then, as a nonaqueous electrolyte, an electrolyte obtained by dissolving lithium salt $LiBF_4$ in a mixed solvent of organic solvents EC and GBL (1:2 by volume) by 1.5 mol/L was poured in the metal can. Subsequently, the lid was placed such that the heads of terminals of the negative electrode and positive electrode were positioned at the opening side of the metal can. The leading ends of the negative electrode leads connected to the negative electrodes of the laminated electrode group in the metal can were gathered at the lower side of the head of the negative electrode terminal and bonded by resistance welding, and the leading ends of the positive electrode leads connected to the positive electrodes of the laminated electrode group were gathered at the lower side of the head of the positive electrode terminal and bonded by resistance welding. Thereafter, the lid was fitted to the opening of the metal can, and the outer edge of the lid and the opening of the metal can were connected by laser welding to compose an outer container. Consequently, a square nonaqueous electrolyte secondary battery with a height of 335 mm, length of 142 mm, width of 15 mm, and discharge capacity of 40 Ah as shown in FIGS. 1 and 2 was manufactured. A resistance value of alternating-current impedance of 1 kHz of the secondary battery was 0.5 mΩ.

Examples 2 to 7

Square nonaqueous electrolyte secondary batteries were manufactured in the same manner as in Example 1, except that a negative electrode terminal formed of aluminum alloy having a composition shown in Table 1 and a negative electrode lead formed of aluminum alloy having a composition shown in Table 1 were used.

Example 8

A square nonaqueous electrolyte secondary battery was manufactured in the same manner as in Example 1, except that a negative electrode terminal was used, the negative electrode terminal being obtained by covering the entire surface of a copper terminal body shown in FIG. 4 with an aluminum alloy plating layer of 100 μm in thickness having a composition shown in Table 1.

Example 9

A square nonaqueous electrolyte secondary battery was manufactured in the same manner as in Example 1, except that a negative electrode terminal was used, the negative electrode terminal being obtained by covering the entire surface of an iron terminal body shown in FIG. 4 with an aluminum alloy plating layer of 100 μm in thickness having a composition Table 1.

Example 10

A square nonaqueous electrolyte secondary battery was manufactured in the same manner as in Example 1, except that a negative electrode terminal was used, the negative electrode terminal being obtained by covering the entire surface of a nickel terminal body shown in FIG. 4 with an aluminum alloy plating layer of 100 μm in thickness having a composition shown in Table 1.

Example 11

A square nonaqueous electrolyte secondary battery was manufactured in the same manner as in Example 1, except that an anatase type $TiO_2$ heat treated at 350° C. was used as a negative electrode active material.

Example 12

Figure 6:
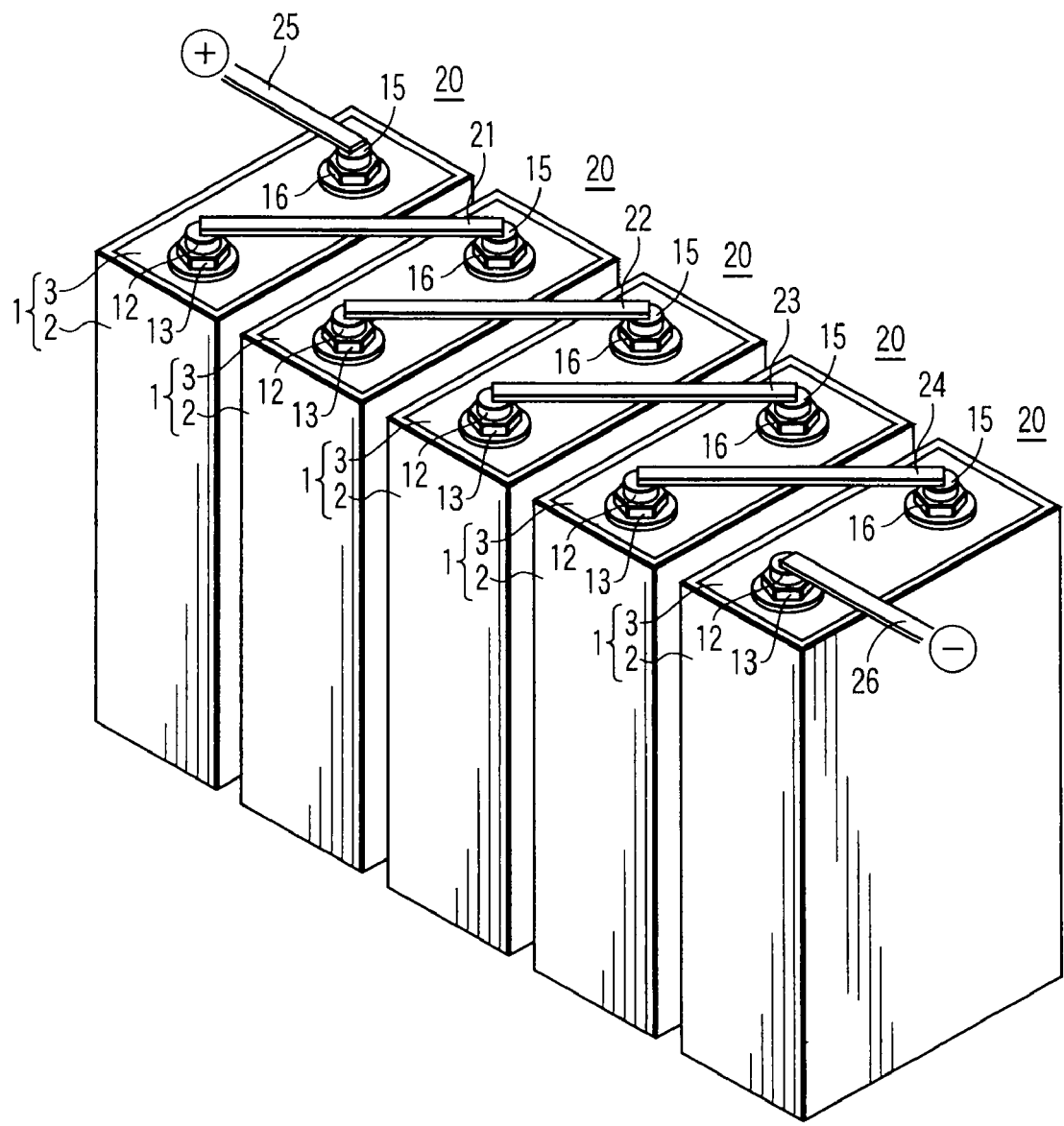
FIG. 6 is a perspective view showing a battery module according to the first embodiment.

A battery module shown in FIG. 6 was assembled by connecting five square nonaqueous electrolyte secondary batteries as in Example 1 in series by use of copper connection leads.

Comparative Examples 1 to 5

Square nonaqueous electrolyte secondary batteries were manufactured in the same manner as in Example 1, except that a negative electrode terminal formed of metal shown in Table 1 was used. In Comparative examples 1, 4, and 5, negative electrode leads made of aluminum alloy having a composition shown in Table 1 were used.

Comparative Example 6

A battery module was assembled by connecting five square nonaqueous electrolyte secondary batteries as in Comparative example 1 in series by use of copper connection leads.

In the obtained square nonaqueous electrolyte secondary batteries in Examples 1 to 11 and Comparative examples 1 to 5, and the battery modules in Example 12 and Comparative example 6, long-term charge and discharge cycle tests were conducted to evaluate the output performance after specified cycles.

The square nonaqueous electrolyte secondary batteries were evaluated after 1000 cycles of a quick charge and overdischarge cycle test under high temperature and high humidity, and then, the output density (kW/kg) obtained from the maximum current obtained until 1.5 V in 10 seconds was measured. In the quick charge and overdischarge cycle test, charging at a constant voltage (maximum current 400 A) of 2.8 V was performed for 6 minutes under the environment of a temperature of 60° C. and humidity of 90%, and subsequently, a constant current discharge at 400 A until 0 V was repeated.

The battery modules were evaluated after 1000 cycles of a quick charge and overdischarge cycle test under high temperature and high humidity, and then, the output density (kW/kg) obtained from the maximum current picked up until 7.5 V in 10 seconds was measured. In the quick charge and overdischarge cycle test, charging at a constant voltage (maximum current 400 A) of 14 V was performed for 6 minutes under the environment of a temperature of 60° C. and humidity of 90%, and subsequently, a constant current discharge at 400 A until 7.5 V was repeated.

These results are shown in Table 1.

TABLE 1

|  | Negative electrode terminal: numerals in parentheses denote wt. % | Negative electrode lead: numerals in parentheses denote wt. % | Output density (after 1000 cycles) (kW/kg) |
|---|---|---|---|
| Example 1 | Mg(1) Si(0.6) Cu(0.25) Al(balance) alloy | Al(99.9) | 2.0 |
| Example 2 | Mg(1.6) Mn(1) Fe(0.5) Cu(0.2) Al(balance) alloy | Al(99.3) | 2.3 |
| Example 3 | Mg(5) Mn(0.1) Cr(0.1) Al(balance) alloy | Mg(0.5) Al(balance) alloy | 1.8 |
| Example 4 | Mg(0.7) Si(1) Cr(0.25) Al(balance) alloy | Mg(0.5) Al(balance) alloy | 1.9 |
| Example 5 | Mg(0.7) Si(0.4) Al(balance) alloy | Mg(0.5) Al(balance) alloy | 2.0 |
| Example 6 | Mg(1.4) Al(balance) alloy | Mg(0.5) Al(balance) alloy | 2.1 |
| Example 7 | Mg(1.6) Mn(1) Fe(0.5) Cu(0.2) Al(balance) alloy | Mg(0.5) Al(balance) alloy | 2.4 |
| Example 8 | Cu main body + Cu(0.1) Mg(1) Al (balance) plated layer | Al(99.9) | 2.2 |
| Example 9 | Fe main body + Fe(1.1) Al(balance) plated layer | Al(99.9) | 1.8 |
| Example 10 | Ni main body + Ni(0.1) Mg(1) Al(balance) plated layer | Al(99.9) | 2.0 |
| Example 11 | Mg(1) Si(0.6) Cu(0.25) Al(balance) alloy | Al(99.9) | 2.0 |
| Example 12 | Mg(1) Si(0.6) Cu(0.25) Al(balance) alloy | Al(99.9) | 1.6 |
| Comparative example 1 | Cu | Cu(4.5) Al(balance) alloy | 0.2 |

TABLE 1-continued

|  | Negative electrode terminal: numerals in parentheses denote wt. % | Negative electrode lead: numerals in parentheses denote wt. % | Output density (after 1000 cycles) (kW/kg) |
|---|---|---|---|
| Comparative example 2 | Ni | Al(99.9) | 0.3 |
| Comparative example 3 | Fe | Al(99.9) | 0.1 |
| Comparative example 4 | Al(99.9) | Cu(4.5) Al(balance) alloy | 0.5 |
| Comparative example 5 | Cu | Cu(4.5) Al(balance) alloy | 0.1 |
| Comparative example 6 | Cu | Cu(4.5) Al(balance) alloy | 0.15 |

As is clear from Table 1, the square nonaqueous electrolyte secondary batteries in Examples 1 to 11, each having a negative electrode lead made of aluminum with a purity of 99 wt. % or more, or aluminum alloy with an aluminum purity of 99 wt. % or more, and a negative electrode terminal at least the surface of which connected to the negative electrode lead was made of aluminum alloy with an aluminum purity of less than 99 wt. % containing at least a metal component selected from the group consisting of Mg, Cr, Mn, Cu, Si, Fe and Ni, are known to be superior in output performance after quick charge and overdischarge cycles at a high temperature of 60° C. and high humidity of 90%, as compared with Comparative examples 1 to 5.

The battery module in Example 12 manufactured by connecting five square nonaqueous electrolyte secondary batteries in Example 1 in series is known to be superior in output performance after quick charge and overdischarge cycles at a high temperature of 60° C. and high humidity of 90%, as compared with the battery module in Comparative example 6 manufactured by connecting five square nonaqueous electrolyte secondary batteries in Comparative example 1 in series.

Example 13

In Example 13, a square nonaqueous electrolyte secondary battery has a structure including an outer container serving also as a negative electrode terminal.

Preparation of Lid with Positive Electrode Terminal

A hole for holding a terminal was opened in a lid composing an outer container serving also as a negative electrode terminal together with a metal can described below. The lid was formed of aluminum alloy with a length of about 141.6 mm, a width of about 14.6 mm, and thickness of 0.3 mm, comprising 0.3 wt. % of Mg, 1.2 wt. % of Mn, 0.4 wt. % of Fe, and the balance substantially of Al. A tubular insulating member having circular flanges at both ends thereof was fitted in the hole of the lid. A bolt-like positive electrode terminal with a head diameter of 10 mm was inserted in the tubular insulating member of the lid, and its threaded portion was protruded to the lid side opposite to the head. A bolt made of aluminum alloy was screwed in this threaded portion through a washer made of aluminum alloy, so that the positive electrode terminal was fixed to the lid through the tubular insulating member. The positive electrode terminal was formed of aluminum alloy comprising 1 wt. % of Mg, 0.6 wt. % of Si, 0.25 wt. % of Cu, and the balance substantially of Al.

The bolt and washer were formed of aluminum alloy comprising 1 wt. % of Mg, 0.6 wt. % of Si, 0.25 wt. % of Cu, and the balance substantially of Al.

Assembly of Secondary Battery

As in Example 1, a laminated electrode group was manufactured, the laminated electrode group was inserted into a rectangular tubular metal can with a bottom, and an electrolyte was injected into the metal can. The metal can was formed of aluminum alloy comprising 1.2 wt. % of Mn, 0.1 wt. % of Si, 0.4 wt. % of Fe, and the balance substantially of Al, and was cut in a size of 335 mm in height, 142 mm in length, 15 mm in width, and 0.2 mm in thickness. Subsequently, the lid was placed such that the head of the positive terminal was positioned at the opening side of the metal can. The leading ends of the negative electrode leads connected to the negative electrodes of the laminated electrode group in the metal can were gathered at the lower side of the lid and bonded by resistance welding, and the leading ends of the positive electrode leads connected to the positive electrodes of the laminated electrode group were gathered at the lower side of the head of the positive electrode terminal and bonded by resistance welding. Thereafter, the lid was bonded to the opening of the metal can, and the outer edge of the lid and the opening of the metal can were connected by laser welding to compose an outer container serving also as a negative electrode terminal. Consequently, a square nonaqueous electrolyte secondary battery with a height of 335 mm, length of 142 mm, width of 15 mm, and discharge capacity of 40 Ah as shown in FIGS. 7 and 8 was manufactured. A resistance value of an alternating-current impedance of 1 kHz of the secondary battery was 0.5 mΩ.

Examples 14 and 15

Square nonaqueous electrolyte secondary batteries were manufactured in the same manner as in Example 13, except that an outer container (metal can and lid) made of aluminum alloy having a composition shown in Table 2 and a negative electrode lead made of aluminum alloy having a composition shown in Table 2 were used.

Example 16

Figure 9:
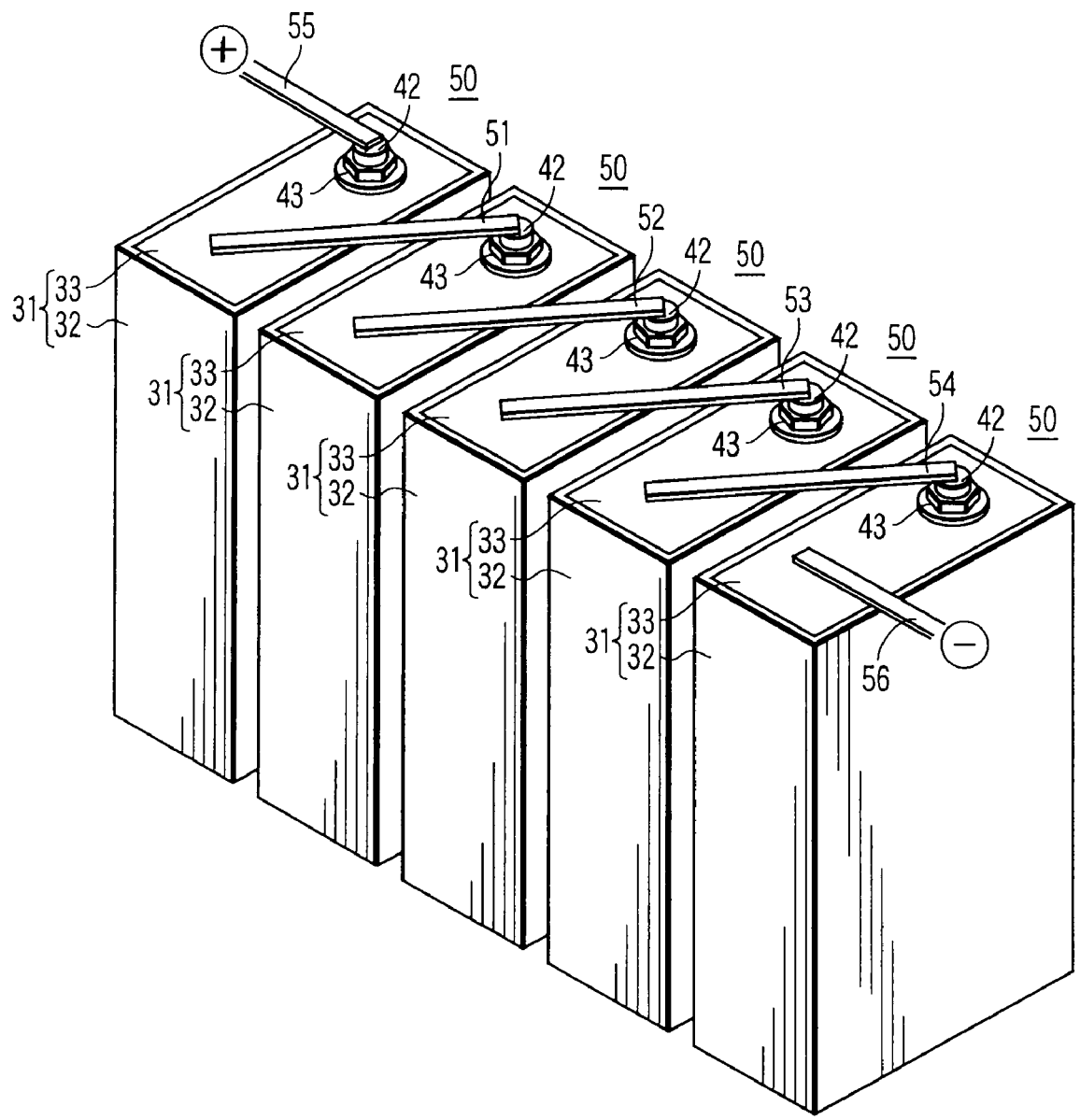
FIG. 9 is a perspective view showing a battery module according to the second embodiment.

A battery module shown in FIG. 9 was assembled by connecting five square nonaqueous electrolyte secondary batteries as in Example 13 in series by use of copper connection leads.

In the obtained square nonaqueous electrolyte secondary batteries in Examples 13 to 15, and the battery module in Example 16, long-term charge and discharge cycle tests were conducted in the same manner as in Example 1 to evaluate the output performance after specified cycles.

These results are shown in Table 2.

TABLE 2

| | Outer Container | | Negative electrode lead: numerals in parentheses denote wt. % | Output density (after 1000 cycles) (kW/kg) |
|---|---|---|---|---|
| | Metal can: numerals in parentheses denote wt. % | Lid: numerals in parentheses denote wt. % | | |
| Example 13 | Mn(1.2) Si(0.2) Fe(0.4) Al(balance) alloy | Mg(0.3) Mn(1.2) Fe(0.4) Al(balance) alloy | Al(99.9) | 1.8 |
| Example 14 | Mn(1.0) Si(0.6) Fe(0.4) Al(balance) alloy | Mg(0.3) Mn(1.2) Fe(0.4) Al(balance) alloy | Al(99.9) | 2.0 |
| Example 15 | Mn(1.5) Si(0.1) Fe(0.4) Al(balance) alloy | Mg(0.2) Mn(1.2) Fe(0.4) Al(balance) alloy | Mg(0.5) Al(balance) alloy | 2.2 |
| Example 16 | Mn(1.2) Si(0.1) Fe(0.4) Al(balance) alloy | Mg(0.1) Mn(1.2) Fe(0.4) Al(balance) alloy | Al(99.9) | 2.0 |

As is clear from Table 2, the square nonaqueous electrolyte secondary batteries in Examples 13 to 15, each having a negative electrode lead made of aluminum with a purity of 99 wt. % or more, or aluminum alloy with an aluminum purity of 99 wt. % or more, and an outer container (lid) at least the inner surface of which connected to the negative electrode lead was formed of aluminum alloy with a purity of less than 99 wt. % containing at least a metal component selected from the group consisting of Mg, Cr, Mn, Cu, Si, Fe and Ni, are known to be superior in output performance after quick charge and overdischarge cycles at high temperature of 60° C. and high humidity of 90%, as compared with Comparative examples 1 to 5 shown in Table 1.

The battery module in Example 16 assembled by connecting five square nonaqueous electrolyte secondary batteries in Example 13 in series is known to be superior in output performance after quick charge and overdischarge cycles at a high temperature of 60° C. and high humidity of 90%, as compared with the battery module in Comparative example 6 shown in Table 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery having an internal resistance of 10 mΩ or less as an alternating-current impedance value of 1 kHz, comprising:
    a metal outer container;
    a nonaqueous electrolyte contained in the container;
    a positive electrode contained in the container;
    a negative electrode contained in the container and having an active material for intercalating lithium ions at a potential of 0.4 V or more with respect to an electrode potential of lithium;
    a separator interposed between the negative electrode and the positive electrode;
    a negative electrode lead having a first end connected to the negative electrode, the negative electrode lead being made of aluminum with a purity of 99 wt. % or more, or an aluminum alloy with an aluminum purity of 99 wt. % or more; and
    a negative electrode terminal attached to the outer container so as to be connected electrically to a second end of the negative electrode lead, and including a terminal body made of at least one metal selected from the group consisting of copper, iron and nickel, and a layer formed on the surface of the terminal body to which the second end of the negative electrode lead is connected, the layer being made of aluminum alloy which has an aluminum purity of 90 wt. % or more and less than 99 wt. % and which comprises 0.5 to 5 wt. % of Mg.

2. The secondary battery according to claim 1, wherein the layer of the negative electrode terminal is made of an aluminum alloy consisting of:
    90 wt. % or more and less than 99 wt. % of Al;
    0.5 to 5 wt. % of Mg; and
    at least one metal selected from the group consisting of 0.5 to 5 wt. % of Mg, 0.5 wt. % or less of Cr, 0.3 to 2.0 wt. % of Mn, 5 wt. % or less of Cu, 1 wt. % or less of Si, 1 wt. % or less of Fe, and 1 wt. % or less of Ni.

3. The secondary battery according to claim 1, wherein the active material of the negative electrode comprises titanium-containing oxide particles having an average diameter of 1 μm or less.

4. The secondary battery according to claim 1, wherein the nonaqueous electrolyte comprises at least one of solvent selected from the group consisting of propylene carbonate, ethylene carbonate and γ-buthyrolactone, and at least one electrolyte selected from the group consisting of LiPF$_6$ and LiBF$_4$.

5. The secondary battery according to claim 1, wherein the negative electrode has a current collector composed of an aluminum foil or aluminum alloy foil with a purity of 99 wt. % or more.

6. The secondary battery according to claim 1, wherein the outer container comprises a metal can, and a metal lid bonded to an opening of the metal can,
    wherein the metal can comprises an aluminum alloy comprising at least one metal selected from the group consisting of Mg, Mn and Fe.

7. A battery module assembled by connecting a plurality of nonaqueous electrolyte secondary batteries according to claim 1.

8. The secondary battery according to claim 1, wherein the negative electrode lead is made of aluminum having a purity of 99.9 wt. % or more.

9. The secondary battery according to claim 1, wherein the layer of the negative electrode terminal is formed on the entire surface of the terminal body.

10. The secondary battery according to claim 1, wherein the layer of the negative electrode terminal is made of an aluminum alloy consisting of:
    90 wt. % or more and less than 99 wt. % of Al;
    0.5 to 5 wt. % of Mg;

0.3 to 2.0 wt. % of Mn; and 0.1 wt. % or less of at least one metal selected from Cu, Fe, Si and Cr.

11. The secondary battery according to claim 1, wherein the positive electrode comprises an active material selected from the group consisting of lithium manganese composite oxide, lithium nickel composite oxide, lithium cobalt composite oxide, lithium nickel cobalt composite oxide, spinel type lithium manganese nickel composite oxide, lithium manganese cobalt composite oxide, iron lithium phosphate and lithium nickel cobalt manganese composite oxide having a laminar crystal structure.

* * * * *